United States Patent
Doyle

(10) Patent No.: US 7,853,271 B2
(45) Date of Patent: Dec. 14, 2010

(54) METHOD AND APPARATUS FOR INTERLOCKING COMMUNICATION AND TRACKING APPLICATIONS IN A WIRELESS COMMUNICATION DEVICE

(75) Inventor: Thomas F. Doyle, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1070 days.

(21) Appl. No.: 11/345,843

(22) Filed: Feb. 1, 2006

(65) Prior Publication Data

US 2007/0178908 A1 Aug. 2, 2007

(51) Int. Cl.
*H04W 24/00* (2009.01)
(52) U.S. Cl. .............. 455/456.2; 455/404.2; 455/456.1; 455/456.3; 455/456.4; 455/456.5; 455/456.6; 455/457; 455/418; 455/419; 455/420; 379/102.01; 342/357.06; 342/357.07
(58) Field of Classification Search .............. 455/404.2, 455/418–420, 456.1–456.6, 457; 342/357.06, 342/357.07; 379/102.01
See application file for complete search history.

(56) References Cited

U.S. PATENT DOCUMENTS

| | | | | |
|---|---|---|---|---|
| 5,731,785 | A * | 3/1998 | Lemelson et al. | 342/357.07 |
| 5,930,342 | A * | 7/1999 | Mazzapica | 379/102.01 |
| 6,011,973 | A * | 1/2000 | Valentine et al. | 455/456.6 |
| 6,138,003 | A * | 10/2000 | Kingdon et al. | 455/410 |
| 6,448,927 | B1 * | 9/2002 | Ishigaki et al. | 342/357.06 |
| 6,690,940 | B1 * | 2/2004 | Brown et al. | 455/456.4 |
| 7,353,034 | B2 * | 4/2008 | Haney | 455/457 |
| 2002/0039896 | A1 * | 4/2002 | Brown | 455/419 |
| 2004/0162052 | A1 * | 8/2004 | Jang et al. | 455/404.2 |
| 2004/0203927 | A1 | 10/2004 | Kraft | |
| 2004/0212479 | A1 * | 10/2004 | Gilbert et al. | 340/10.34 |

FOREIGN PATENT DOCUMENTS

| EP | 1113678 A2 | 7/2001 |
|---|---|---|
| WO | 02/058426 A1 | 7/2002 |

OTHER PUBLICATIONS

Inernational Preliminary Report on Patentability-PCT/US07/061493, The International Bureau of WIPO, Geneva Switzerland-Aug. 5, 2008.
International Search Report-PCT/US07/061493, International Search Authority-European Patent Office-Jul. 3, 2007.
Written Opinion-PCT/US07/061493, International Search Authority-European Patent Office-Jul. 3, 2007.

* cited by examiner

*Primary Examiner*—Stephen M D'Agosta
(74) *Attorney, Agent, or Firm*—Ashish L. Patel

(57) ABSTRACT

A wireless communication device transmits location information associated with a mobile worker, and provides an option to the mobile worker to disable such location transmissions. The use of the location transmission function is enhanced by interlocking the location tracking function with one or more other functions of the wireless communication device. When the tracking function is disabled, one or more other functions that the mobile worker finds valuable are also disabled, thus reducing the likelihood that the mobile worker will disable location tracking. Rules may be implemented to disable the other functions only in the event that disabling the tracking function violates a violated. Location monitoring for such workers is thereby enhanced.

15 Claims, 3 Drawing Sheets

METHOD AND APPARATUS FOR INTERLOCKING COMMUNICATION AND TRACKING APPLICATIONS IN A WIRELESS COMMUNICATION DEVICE

BACKGROUND

1. Field

This disclosure relates generally to mobile communications systems, and more particularly to tracking the location of mobile workers using mobile communications devices.

2. Background

Mobile workers in recent years have increasingly become equipped with wireless communications devices. Both the mobile worker and the businesses that employ these workers increasingly rely on such devices to send and receive tasks, status information, and communications in general. Such wireless communications devices initially included pagers that a dispatch or other party could use to send various messages to the mobile worker, such as messages to call a particular number and/or text messages. The wireless communications devices evolved to provide voice connections such as with cellular telephones, and have become increasingly complex in recent years with the ability to provide voice communications and send/receive text/data messages over a wireless communications device capable of both voice and two-way text/data communications. In many instances, mobile workers receive dispatch to jobs over such devices, acknowledge the dispatch and accept/decline the jobs over such devices and periodically update the status of a job using such devices.

More recently, communications devices have incorporated position sensing components such as a global positioning system (GPS) receivers. GPS receivers rely on a signal received from various GPS satellites to determine a location of the GPS receiver to a fairly high degree of accuracy. Such position sensing components may be used to monitor the position and place or location of a mobile worker. In some instances, the wireless communications device will periodically determine the location of the worker using the position sensing components and transmit this location to a central server or central dispatch. In this manner, the dispatch may monitor the location of a particular mobile worker. Such location monitoring may be used to verify the productivity of the worker and may also be used to determine which of a number of mobile workers should receive dispatches to certain jobs.

For example, a utility service worker may carry such a wireless communication device that has position sensing capability. A dispatch may receive periodic updates from the wireless communication device indicating the position of the mobile worker. In the event that a new job comes into the dispatch which needs to be sent to a mobile worker to complete, the dispatch may send such a job to a worker in close proximity to the location of the new job. Similarly, in the trucking industry it is often desirable to monitor the progress of a shipment using such a tracking feature.

However, such location tracking has raised privacy concerns for many mobile workers prompting communication device manufacturers to integrate an "opt-out" function that a user may select to disable tracking. Such an opt-out function reduces the value of tracking mobile workers.

SUMMARY

A method and system are disclosed for enhancing location tracking of mobile workers while providing an option for a user to disable the location tracking function. In one embodiment, a method is provided for enhancing the use of location tracking in a wireless communication device that provides tracking location functionality and the option for a user to disable the location tracking functionality, comprising: (a) tracking the location of the wireless communication device using a location sensing component within the wireless communication device; (b) determining that the user of the wireless communication device has disabled the location tracking function; and (c) disabling at least one function of the wireless communication device that is different than the location tracking function. Further, the wireless communication device may generate a notification that the location tracking function has been disabled. The at least one function that is disabled may be a voice communication function and/or data messaging function. In one embodiment, the disabling includes: (a) accessing a rule associated with the wireless communication device; (b) determining whether disabling the location tracking function violates the rule; and (c) disabling the function of the wireless communication device that is different than the location tracking function when the rule is violated. The rule associated with the wireless communication device may include a priority of work assignment rule that is violated when the priority of a current work assignment is higher than a pre-set priority. The rule may also include a business schedule and be violated when the current time is within the business schedule. The rule may also include a user status and be violated when the status of the user is below a pre-set status. The rule may also include the status of a work assignment, and be violated when the current work assignment is past due.

In another embodiment, a wireless communication device is provided comprising: (a) a wireless transmitter/receiver operable to send/receive wireless signals over a wireless communication network; (b) a location sensor operable to determine a location of the wireless communication device and output location information; (c) a user interface; and (d) a controller operably interconnected to the transmitter/receiver, location sensor, and user interface, and operable to cause the transmission of the location information from the transmitter/receiver and to disable the transmission of location information when a pre-determined input is received from the user interface, and wherein the controller is also operable to disable at least one other function of the wireless communication device in addition to disabling the transmission of location information when the pre-determined input is received. The disabled function may be a voice communications function and/or data messaging function, for example. In one embodiment, the controller is further operable to cause the transmission of a notification when the pre-determined input is received. In another embodiment, the controller disables the transmission of location information and starts a timer, the timer being stopped when a second input is received that re-enables location information transmission, and wherein the function other than location information transmission is disabled when the timer expires.

DETAILED DESCRIPTION

A need and desire exists on the part of enterprises employing mobile workers to maintain value of tracking the mobile worker's location using a wireless communication device that allows a user to disable the location tracking function. It is further recognized that a company is generally not interested in tracking the location of a worker that is not on the job in most instances, and that in certain instances, such as if a worker is on call, the company may want to know the location of the worker at all times. Systems, methods, and apparatuses are therefore provided to address the needs of both the mobile worker and the company by disabling one or more other features, in addition to the tracking feature, when a mobile worker disables the tracking feature.

Figure 1:
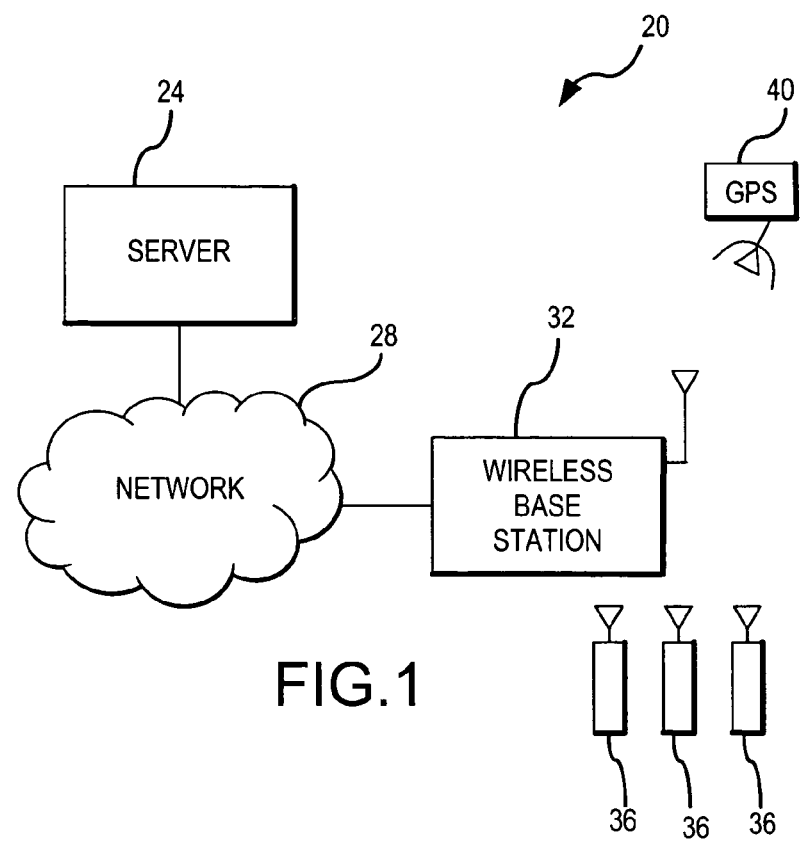
FIG. 1 is a block diagram illustration of a wireless communication network.

FIG. 1 is a block diagram of an exemplary mobile communications network 20. The mobile communications network includes a server 24 which is interconnected to a network 28. The server 24 may reside in a dispatch center for a company, or may be connected to a dispatch center via another network (not shown) such at the Internet. The server 24 in embodiments hereof receives communications from and sends communications, including various commands, to wireless communication devices 36. As is common in the art, such wireless communications devices 36 may include mobile handsets capable of sending and receiving voice calls and text/data messages. Such communication devices 36 may also include units that are built into a vehicle that the mobile worker uses when working. The network 28 may be a public switched telephone network (PSTN), or any other network or combination of networks that are known in the art, that connect the server 24 to a wireless base station 32. The wireless base station 32 operates to provide wireless communications between the network 28 and mobile communication devices 36. As will be understood, a wireless communication network 20 will typically contain numerous wireless base stations 32. One such station 32 is included in the illustration of FIG. 1 simply to clarify the drawing, with the understanding that numerous such wireless base stations 32 may be present in the wireless communication network 20. The wireless base stations 32 and wireless communication devices 36 may communicate using any applicable wireless communication scheme over a voice channel and/or control channel. Communication may use any available analog and/or digital technology, including the various different types of digital communications, as well as combinations thereof. The wireless communication devices 36 also include position sensing receivers that are capable of providing the location of the wireless communication device. In this embodiment, the position sensing receivers include GPS receivers that receive signals from various GPS satellites 40. As is understood in the art, a GPS receiver operates to provide location information to a relatively high degree of accuracy by performing well known trilateration algorithms based on signals from several GPS satellites 40. While GPS is illustrated in this embodiment, it will be understood that any type of position sensing may be used, such as, for example, other satellite based position sensing, base station based position sensing such as AFLT, hybrid systems that use satellite and/or base station based position sensing, and RF profile recording systems, to name but a few.

In one specific embodiment, the server 24 is located in a control and dispatch center of a service industry having mobile workers that perform services at various customer sites, each of the mobile workers having one or more communication devices 36. A dispatcher located at the dispatch center enters a command to dispatch a job to server 24. For example, a dispatcher may take a service call from a customer, and provide with the dispatch command the customer address along with the type of problem to be corrected or addressed by a mobile worker to the server 24. This dispatch is sent as a data message to the wireless communication device 36, that is operating an application that operates to receive such communications. The server 24 may be connected by any appropriate connection to the network 28. The network 28, as mentioned above, may include a public switched telephone network (PSTN), that is in turn connected to the wireless base station 32. The server 24 may have a modem which connects to the network 28 to establish a connection to a particular wireless communication device 26 through the wireless base station 32. Each of the communication devices 36, as is understood, has a unique identification such as a unique phone number and/or other identification. The server 24 may establish any type of communication with the wireless communication device 36 to indicate that the job is waiting. In one embodiment, the server 24 pushes the job and relevant information to a desired wireless communication device 36 using a control channel associated with the wireless communication network. In this embodiment, the wireless communication device 36 includes an application that receives the job and relevant information and provides an indication to a mobile worker that such a job is waiting. The mobile worker may access the application through a user interface on the wireless communication device 36 and review the dispatch. The worker, in some embodiments, may and either accept the job or reject the job, with an acknowledgment sent back to the server through the wireless base station 32 and network 28. In one embodiment, when the mobile worker acknowledges the dispatch, the wireless communication device 36 transmits location information provided from the position receiver to the server 24 at predetermined intervals. Such communications will be described in further detail below. Alternatively, in some embodiments, the mobile communication device 36 receives jobs and transmits location information only during business hours. Such an embodiment in further detail below.

Figure 2:
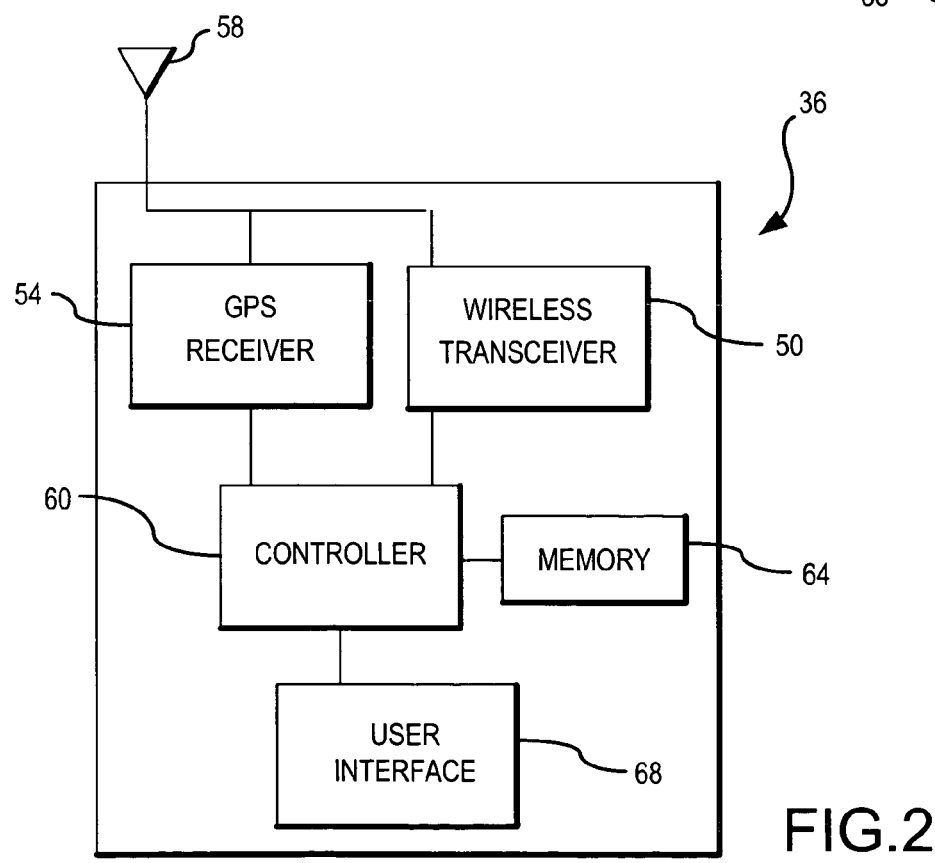
FIG. 2 is a block diagram illustration of a wireless communication device of an embodiment described herein.

Referring now to FIG. 2, an embodiment of a wireless communications device 36 is described. In this embodiment, the wireless communications device 36 includes circuitry and components that are typical of many such devices. The device includes a wireless transceiver 50, a GPS receiver 54 and an antenna 58. The wireless transceiver 50 is operable to receive wireless signals that are received at antenna 58 and demodulate the signals and provide them to a controller 60. The wireless transceiver 50 may also receive signals from the controller, modulate the signals onto an RF signal and transmit the modulated signal over the antenna 58. The GPS receiver 54 is operable to receive a GPS signal from an appropriate number of GPS satellites to determine location information. The GPS receiver 54 is also connected to antenna 58. Antenna 58, while illustrated as a single antenna, may include one or more separate antennas, such as a separate antenna for the GPS receiver, a send antenna, and/or a receive antenna. The controller 60 is coupled to a memory 64 and a user interface 68. The controller 60 controls operations of the wireless communication device 36 including operating any applications that are running on the wireless communication device 36. The memory 64 may include any type of memory suitable for such a wireless communication device including volatile and/or non-volatile memory or other computer readable medium known to one skilled the art. The memory 64 stores computer programs and other executable code to run the different applications for the wireless communication device 36. The user interface 68 may be any appropriate user interface including a visual and/or graphical user interface and associated keypad and/or any other physical input device.

Figure 3:
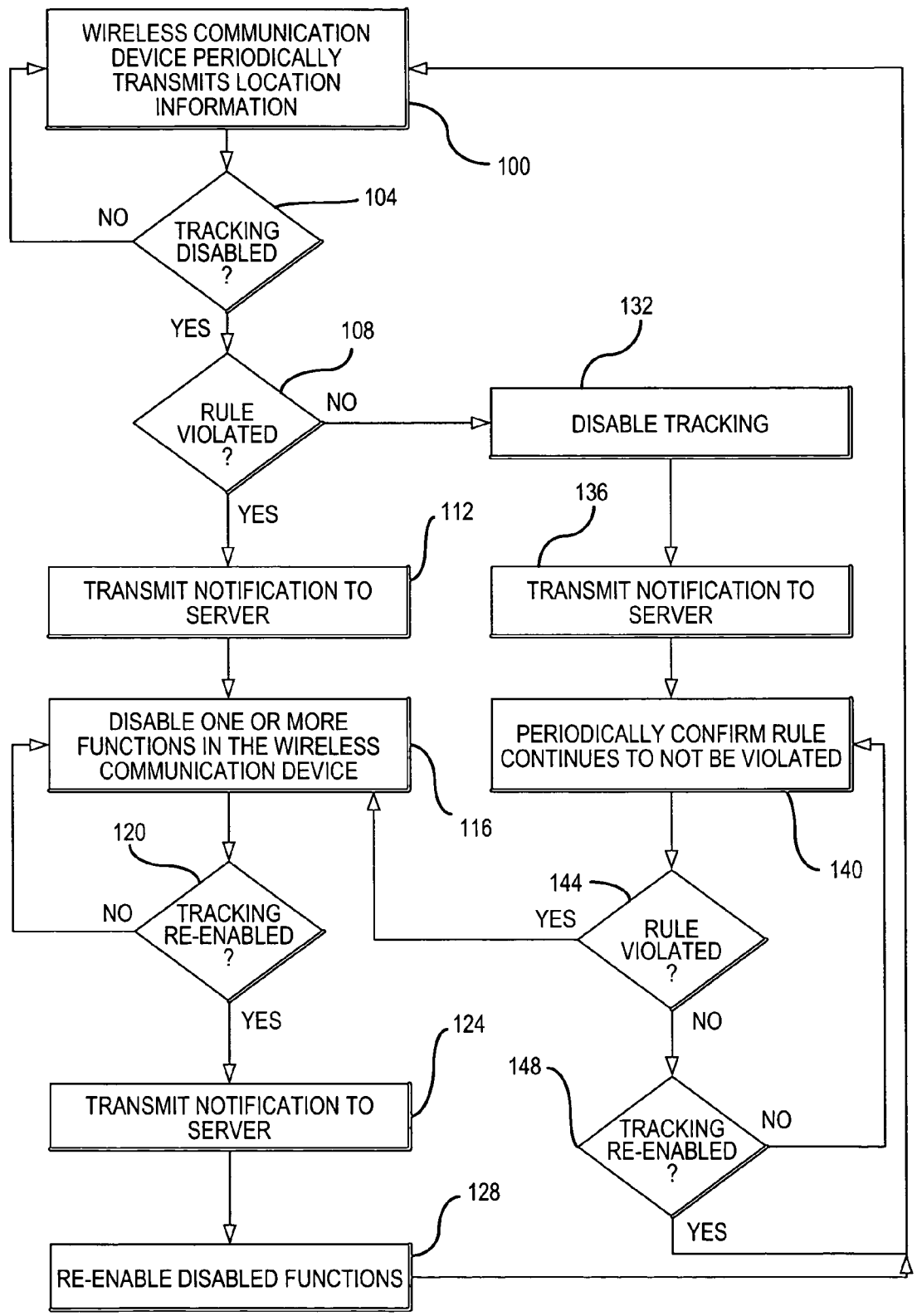
FIG. 3 is a flow chart diagram illustrating the operations of a wireless communication device of an embodiment.

Referring now to FIG. 3, the operations of a wireless communication device of an embodiment are now described. Initially, at block 100, the wireless communication device periodically transmits location information. As discussed above, the wireless communication device includes a location detection component that determines the location of the wireless communication device. This location is periodically transmitted to a server, such as a server in a dispatch center, and may be used to monitor the location of a mobile worker that is associated with the wireless communication device. The frequency at which the location is transmitted may be selected for a particular application and tracking requirements for such an application. For example, a trucking enterprise may desire to receive location information from drivers with such wireless communications devices at a relatively high frequency in order to monitor the route that a particular truck is taking. Other applications may require less frequent tracking, such as a gas/electric utility where service workers carry mobile communications devices on service calls, and tracking is required only a few times per hour. In one embodiment, the frequency of tracking is selectable based on the needs of a particular company or enterprise. At block 104, it is determined if tracking is disabled. As described above, many wireless communications devices provide an option for a user to opt-out of such tracking. Such options are provided in order to provide mobile workers with increased privacy. If tracking is not disabled at block 104, the wireless communication device continues periodic transmission of location information as described at block 100. If tracking is disabled at block 104, it is determined if a rule related to tracking is violated, as indicated at block 108.

Tracking rules in this embodiment may be set based on the requirements of the company or enterprise that employs the mobile worker, thereby providing customizable rules related to tracking. Tracking rules may be based on any of a number of criteria, and in the event that such rules are violated other functions of the wireless communication device may be disabled as will be described in further detail below. Rules may include, for example, the presence of work assignments, priority of work assignments, the status of work assignments, current time, and status of the mobile worker, to name but a few. If the rules are based on presence of work assignments, if a user disables tracking when the worker is not assigned to any work tasks, the tracking may be disabled without violating the rule. If the rules are based on the priority of any work assignments, a mobile worker having a high priority assignment will violate the rule if tracking is disabled. Similarly, if the rule is based on status of work assignments, a mobile worker that disables tracking when a work assignment is nearly due, or over-due, will violate the rule. In another embodiment, the rules are based on the current time and a business hour schedule. In the event that tracking is disabled during business hours, the rule is violated. In still a further example, the rules are based on a status of the mobile worker. If a mobile worker has significant experience and good work history, they may be allowed to disable tracking without violating a rule. If such a worker is relatively new, or has a history of relatively poor performance, the worker may not be allowed to disable tracking without violating a rule.

With continuing reference to FIG. 3, if it is determined that a rule has been violated at block 108, the wireless communication device transmits a notification to the server, as noted at block 112. At block 116, the wireless communication device disables one or more functions other than the location tracking function. Such other functions may include voice communications, data messaging, or any other function available at the wireless communication device. For example, if voice communications are disabled, the wireless communication device will not allow a user to place a voice call using the wireless communication device. Similarly, if data messaging is disabled, the user will not be able to send and/or receive any data messages. In such a manner, the wireless communication device is rendered to be of limited or no use to the mobile worker if the tracking function is disabled. Given the option of a relatively useless device with no tracking, or a very useful device that has location tracking, in a significant number of instances the mobile worker will elect to allow location tracking in order to maintain the other functions of the wireless communications device. At block 120, it is determined if the location tracking function has been re-enabled. If the tracking function has not been re-enabled, the operations of block 120 are repeated. If the tracking function has been re-enabled, the wireless communication device transmits a notification to the server, as noted at block 124, and any disabled function(s) are re-enabled as noted at block 128.

If, at block 108, it is determined that a rule is not violated, the wireless communication device disables tracking, as noted at block 132. At block 136, a notification is transmitted to the server indicating that tracking has been disabled. While a rule may not be violated when the tracking is initially disabled, the continued disablement of tracking may eventually violate a rule. For example, an enterprise has a rule that tracking may be disabled so long as a task completion is not near due, or over due. When the tracking is initially disabled, the task completion may not be near due or over due, but the rule would be violated when the task is near due or over due. Similarly, an enterprise may have a rule that tracking may be disabled for a certain time period. Upon the expiration of this time period, the rule becomes violated. At block 140, it is periodically confirmed that the rule continues to not be violated. At block 144, it is determined if a rule is violated. If a rule is violated, the operations described beginning at block 116 are repeated. If the rule is not violated, it is determined if tracking has been re-enabled, as indicated at block 148. If tracking has been re-enabled, the operations beginning at block 100 are repeated. If tracking has not been re-enabled, the operations of block 140 are repeated.

Figure 4:
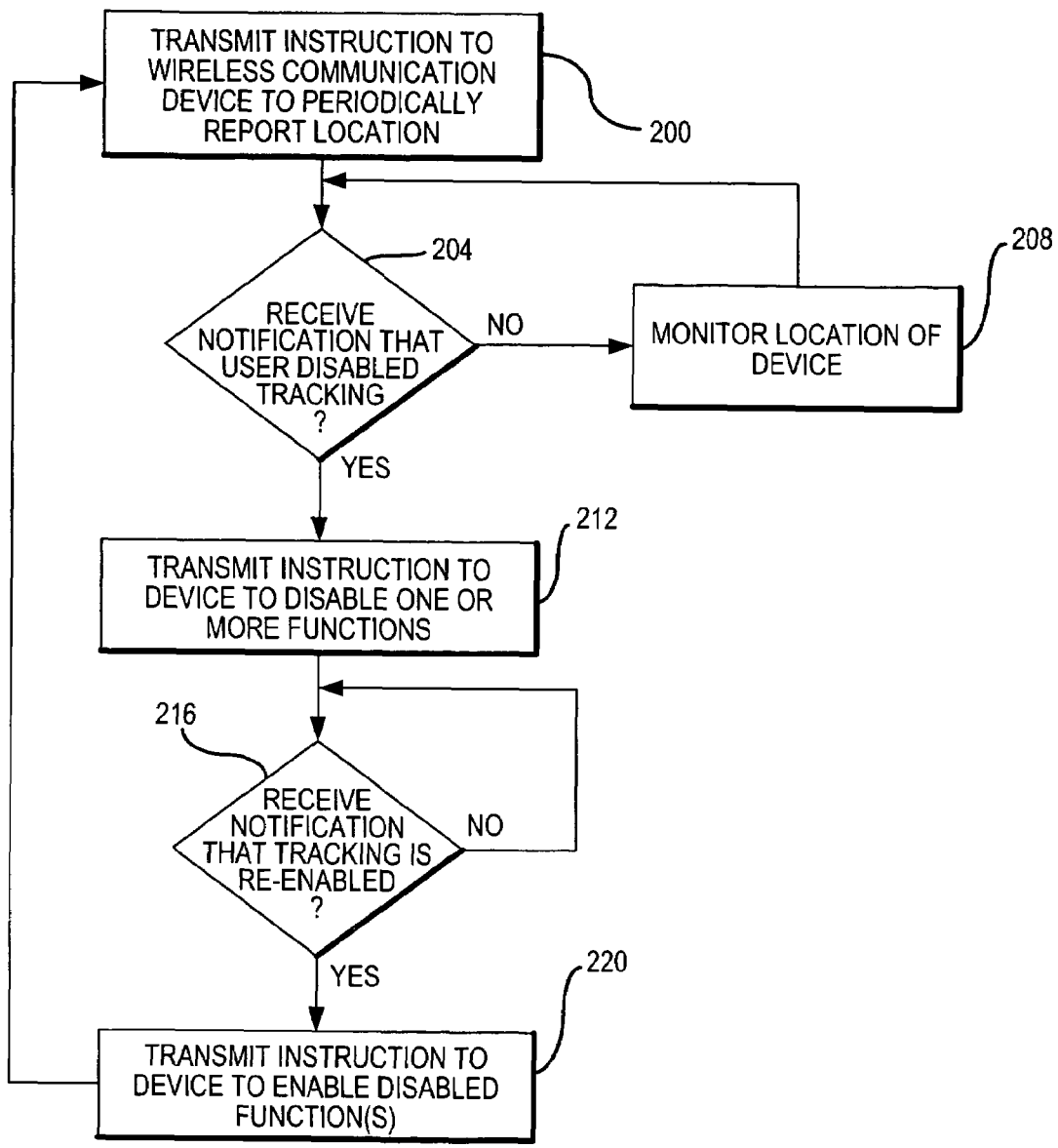
FIG. 4 is a flow chart diagram illustrating the operations of a server of an embodiment.

Referring now to FIG. 4, an embodiment of server operations is described. In this embodiment, the server at block 200 transmits an instruction to the wireless communication device to periodically report location information to the server. Alternatively, the server may periodically query the wireless communication device for a location of the wireless communication device. In the embodiment of FIG. 4, the wireless communication device is operable to transmit such information either at default intervals, or at intervals that are provided by the server. In the event that an enterprise desires to track mobile workers at intervals different than the default intervals, the server may be used to transmit such an instruction to the wireless communication device. If the default intervals of the wireless communication are suitable for the enterprise, this operation may be skipped. At any rate, the server will then receive periodic transmissions from the wireless communication device that indicate the location of the wireless communication device. At block 204, it is determined if a notification is received that the user of the wireless communication device has disabled the tracking function. If such a notification has not been received, the server continues to receive periodic transmissions of the wireless communication device location that may be used to monitor location of a mobile worker, as indicated at block 208.

If, at block 204, it is determined that a notification has been received that the user has disabled the tracking function, the server transmits an instruction to the wireless communication device to disable one or more other functions of the wireless communication device, as noted at block 212. Alternatively, the instruction to disable one or more functions may originate from the wireless device itself. The other function(s) may include voice communications, data messaging, and/or other functions present on the device. In one embodiment, the server also accesses a timekeeping system that is interconnected with a payroll system, and notes the time that tracking is disabled. In such an embodiment, the company or enterprise employing the mobile worker may require that such tracking be enabled while the worker is on the job, and a notification that the worker has disabled tracking means that the worker must not be working. Thus, the timekeeping system may make an appropriate entry that may be used in a payroll system to adjust the worker's hours worked and/or pay. At block 216 it is determined if a notification is received that the tracking function has been re-enabled. If no such notification is received, the operation of block 216 is repeated. If such a notification is received, the server, at block 220, transmits an instruction to the wireless communication device to re-enable any disabled functions. In embodiments where the server also notes tracking disablement in a timekeeping system, an entry may be made in the timekeeping system that indicated when the tracking function is re-enabled. Additionally, in other embodiments, the server may also have a rule set similar to the rules described with respect to FIG. 3. In such embodiments, the server makes determinations on whether a rule is violated, and disabled the other functions in the event of such a rule violation.

The invention claimed is:

1. A method for enhancing the use of location tracking in a wireless communication device that provides location tracking functionality and the option for a user to disable the location tracking function, comprising:
   periodically tracking the location of the wireless communication device using a location sensing component within the wireless communication device;
   determining that a user of the wireless communication device has disabled the location tracking function;
   accessing a rule associated with the wireless communication device;
   determining that disabling the location tracking function violates the rule if a priority of a current work assignment of the user is higher than a pre-set priority, if a status of the user is below a pre-set status, or if the current work assignment of the user is past due; and
   disabling at least one function of the wireless communication device when it is determined that disabling the location tracking function violates the rule, wherein the at least one function is different than the location tracking function and operates independently of the tracked location.

2. The method, as claimed in claim 1, further comprising: generating a notification that the location tracking function has been disabled.

3. The method, as claimed in claim 1, wherein the disabling comprises:
   disabling at least one of a voice communication function and a data messaging function.

4. The method, as claimed in claim 1, wherein determining that disabling the location tracking function violates the rule comprises:
   comparing the current time with a business schedule; and
   determining that the rule is violated when the current time is within the business schedule.

5. A wireless communication device, comprising:
   a wireless transmitter/receiver operable to send/receive wireless signals over a wireless communication network;
   a location sensor operable to determine a location of the wireless communication device and output location information;
   a user interface operable to receive a predetermined input from a user of the wireless communication device to disable transmission of the location information; and
   a controller operably interconnected to said wireless transmitter/receiver, said location sensor, and said user interface, said controller operable to periodically cause the transmission of said location information from said wireless transmitter/receiver, disable said transmission when the predetermined input is received from said user interface, to access a rule associated with the wireless communication device, and to determine that disabling the transmission violates the rule if a priority of a current work assignment of the user is higher than a pre-set priority, if a status of the user is below a pre-set status, or if the current work assignment of the user is past due, wherein
   when the predetermined input is received, the controller is further operable to disable at least a first function of the wireless communication device that operates independently of the location information if it is determined that disabling the transmission violates the rule.

6. The wireless communication device, as claimed in claim 5, wherein the at least a first function includes at least one of a voice communications function and a data messaging function.

7. The wireless communication device, as claimed in claim 5, wherein said controller is farther operable to cause the transmission of a notification when said predetermined input is received.

8. The wireless communication device, as claimed in claim 5, wherein when said predetermined input is received, said controller is operable to disable said transmission and staff a timer, said timer stopped when a second input is received that re-enables said transmission, wherein said first function is disabled when said timer expires.

9. The wireless communication device, as claimed in claim 8, wherein said timer is reset when said second input is received.

10. A computer readable medium storing a computer program capable of causing a programmable device to perform:
   initiating a location tracking function of a wireless communication device to track a location of the wireless communication device;
   determining that a user of the wireless communication device has disabled the location tracking function;
   accessing a rule associated with the wireless communication device;
   determining that disabling the location tracking function violates the rule if a priority of a current work assignment of the user is higher than a pre-set priority, if a status of the user is below a pre-set status, or if the current work assignment of the user is past due; and
   disabling at least one function of the wireless communication device when it is determined that disabling the location tracking function violates the rule, wherein the at least one function is different than the location tracking function and operates independently of the tracked location.

11. The computer readable medium, as claimed in claim 10, wherein said determining comprises:
   determining if an input from a user interface is received to disable the location tracking function; and
   generating a notification that the location tracking function has been disabled.

12. The computer readable medium, as claimed in claim 10, wherein the disabling comprises:
   disabling at least one of a voice communication function and a data messaging function.

13. A wireless communication device, comprising:
   means for sending/receiving wireless signals over a wireless communication network;
   means for determining a location of the wireless communication device and outputting location information;
   means for receiving a predetermined input from a user of the wireless communication device to disable transmission of the location information; and
   operably interconnected to said means for sending/receiving wireless signals, said means for determining a location of the wireless communication device, and said means for receiving a predetermined input from a user, means for periodically causing the transmission of said location information from said means for sending/receiving wireless signals, for disabling said transmission when the predetermined input is received from said means for receiving a predetermined input, for accessing a rule associated with the wireless communication device, for determining that disabling the transmission violates the rule if a priority of a current work assignment of the user is higher than a pre-set priority, if a status of the user is below a pre-set status, or if the current work assignment of the user is past due, and for disabling at least a first function of the wireless communication device that operates independently of the location information if it is determined that disabling the transmission violates the rule, when the predetermined input is received.

14. The wireless communication device, as claimed in claim 13, further comprising means for causing the transmission of a notification when said predetermined input is received.

15. The wireless communication device, as claimed in claim 13, further comprising means for disabling said transmission when said predetermined input is received, for starting a timer, for stopping the timer when a second input is received that re-enables said transmission, and for disabling said first function when said timer expires.

* * * * *

UNITED STATES PATENT AND TRADEMARK OFFICE
CERTIFICATE OF CORRECTION

| | | |
|---|---|---|
| PATENT NO. | : 7,853,271 B2 | Page 1 of 1 |
| APPLICATION NO. | : 11/345843 | |
| DATED | : December 14, 2010 | |
| INVENTOR(S) | : Doyle | |

It is certified that error appears in the above-identified patent and that said Letters Patent is hereby corrected as shown below:

Column 8, line 17, claim 5: "receiver," to read as --receiver to--

Column 8, line 36, claim 7: "farther" to read as --further--

Column 8, line 41, claim 8: "staff" to read as --start--

Signed and Sealed this
Eighth Day of May, 2012

David J. Kappos
*Director of the United States Patent and Trademark Office*